United States Patent [19]

Ayers et al.

[11] 3,948,700

[45] Apr. 6, 1976

[54] METHOD FOR PRODUCING HIGH TEMPERATURE HYDROGEN

[75] Inventors: Orval E. Ayers, Huntsville; Roy E. Patrick, Redstone Arsenal, both of Ala.

[73] Assignee: The United States of America as represented by the Secretary of the Army, Washington, D.C.

[22] Filed: Nov. 8, 1974

[21] Appl. No.: 522,157

[52] U.S. Cl. ............... 149/109.2; 149/87; 423/648
[51] Int. Cl.$^2$. C06B 23/00; C06B 27/00; C01B 1/00
[58] Field of Search 149/109.2, 109.4, 37, DIG. BH, 149/22, 87; 423/644, 645, 646, 647, 648, 656, 294, 295; 23/302, 303; 252/375

[56] References Cited
UNITED STATES PATENTS

| | | | |
|---|---|---|---|
| 3,108,431 | 10/1963 | Armstrong | 149/109.2 |
| 3,624,117 | 11/1971 | Bartoszek | 149/22 |
| 3,666,672 | 5/1972 | Hiltz | 149/22 |
| 3,734,863 | 5/1973 | Beckert | 423/646 |
| 3,751,566 | 8/1973 | Churchill | 423/645 |
| 3,819,808 | 6/1974 | Mattson | 423/644 |
| 3,862,052 | 1/1975 | Beckert | 423/646 |
| 3,864,465 | 2/1975 | Hoffert | 423/648 |
| 3,880,987 | 4/1975 | Nahas | 423/648 |
| 3,883,644 | 5/1975 | Matzek | 149/87 |

*Primary Examiner*—Leland A. Sebastian
*Assistant Examiner*—Donald P. Walsh
*Attorney, Agent, or Firm*—Nathan Edelberg; Robert P. Gibson; Jack W. Voigt

[57] ABSTRACT

A storable solid propellant composition based on unsolvated aluminum deuteride or unsolvated aluminum hydride and ferric oxide is provided for use in a method for producing high temperature hydrogen or deuterium that is acceptable for use in HF/DF and HCl chemical laser, the gas dynamic laser (GDL), or a source to generate chemically pure and hot hydrogen gas as a reducing fuel.

4 Claims, No Drawings

METHOD FOR PRODUCING HIGH TEMPERATURE HYDROGEN

BACKGROUND OF THE INVENTION

This invention relates to the laser fuels, hydrogen or deuterium, and to solid compositions from which the fuels can be produced.

Since hydrogen gas contained in compressed gas cylinders has been widely used in industry as a source of hydrogen for many industrial processes, this source has been considered and evaluated for laser uses. However, the handling of high pressure compressed hydrogen gas or hydrogen under cryogenic conditions is not acceptable in meeting the requirements for use in chemical lasers.

Chemical lasers require the highest level of purity of reactants which react to form a chemical compound which is in an excited energy state. The formed compound emits coherent radiation energy while returning to ground state.

The prior art method of employing compounds such as lithium aluminum hydride, sodium borohydride, and the like as a source of hydrogen generally requires a catalyst to effect decomposition. Introduction of the catalyst to initiate decomposition provides an opportunity to contaminate the hydrogen generated.

Desirable would be a composition which can be employed in a method to yield high purity hydrogen from a self sustaining reaction once the reaction is initiated. Also desirable would be a composition which can be employed in a method to yield high purity deuterium from a self sustaining reaction once the reaction is initiated. Thus, both desirable and required is a method which includes a reaction initiation step which does not introduce impurities for comtaminating the liberated hydrogen or deuterium.

Therefore, an object of this invention is to provide a composition and a method for generating hydrogen for use in chemical lasers.

Another object of this invention is to provide a composition and a method for generating deuterium for use in chemical lasers.

A further object of this invention is to provide a solid chemical composition and a method which yields high temperature and high purity hydrogen gas for immediate use in chemical lasers. It is also an object of this invention to provide a solid chemical composition and a method which yields high temperature and high purity deuterium gas for immediate use in chemical lasers.

SUMMARY OF THE INVENTION

A solid propellant composition comprised of stoichiometric amounts of unsolvated aluminum hydride and moisture free ferric oxide is prepared by mixing to achieve uniformity in a blending mill and then pressing into pellets or into metal canisters. When the described solid propellant composition is provided with sufficient heat to effect initiation of a decomposition reaction, the continued decomposition reaction is self-sustaining since the reaction approaches a temperature of about 3,000°C. Because of the high temperature of reaction, hydrogen gas having a high temperature and high purity is produced which meets the requirement for immediate use in a chemical laser. Similarly, aluminum deuteride ($AlD_3$) may be used to produce hot deuterium gas.

DESCRIPTION OF THE PREFERRED EMBODIMENT

Moisture free ferric oxide is prepared by drying hydrated ferric oxide in a furnace at a temperature at least 10 percent higher than that needed to remove water of hydration, i.e. $Fe_2O_3 \cdot XH_2O$, wherein X is the number of molecules water of hydration. $Fe_2O_3$ loses water of hydration at about 500°C and, therefore should be dried at 550°C or above. The metal oxide is then combined stoichiometrically with unsolvated aluminum hydride according to the following reaction equation:

The above reaction produces a temperature sufficient for self-sustaining of the reaction after the reaction is initiated. The reaction temperature approaches that of the reaction of Thermit, trademark for a mixture of aluminum and ferric oxide ($Fe_3O_4$). When Thermit is ignited by a primer (magnesium powder), it liberates heat and forms aluminum oxide and molten iron at about 3000°C.

GENERAL EXAMPLE

A mixture of $Al_3H_3$ and $Fe_2O_3$ in a ratio of about 2 moles of $AlH_3$ to each mole of $Fe_2O_3$ is uniformly mixed in a blending mill and then pressed into pellets or into metal canisters with a press using pressures of at least 500 psi. The pellets and canisters can be made in any diameter and length to produce small or large volumes of hot hydrogen gas.

The following specific example illustrates this invention and its use for generation of hot hydrogen gas. Where deuterium gas is desired, unsolvated deuterium hydride is employed in the reaction in place of unsolvated aluminum hydride.

SPECIFIC EXAMPLE 2.39 grams of dried $Fe_2O_3$ and 0.90 grams of unsolvated aluminum hydride ($AlH_3$) are blended in a small plastic jar by shaking on a mechanical shaker. Using a hydraulic press and a 1.25 inch diameter die, 2.80 grams of the blended propellant powder and pressed into a pellet using a pressure of 500 psi. The pellet is then placed in a sealable combustion apparatus of known volume and fitted with a pressure gauge. The apparatus is adapted for operating under vacuum or pressure. Before ignition is effected, the apparatus vessel is evacuated to remove all the air and water vapor present. Inside the combustor the pressed pellet is positioned to be in contact with a high melting point wire comprised of about 80% nickel and 20 percent chromium (e.g. Nichrome wire). About 10 volts at about 10 amperes are applied to the wire to produce sufficient heat to initiate a reaction. Once the reaction is started, it is self-sustaining and requires no additional external heat. After the reaction is completed and the vessel is cooled to room temperature, the quantity of hydrogen produced is calculated using the known volume, temperature, and pressure.

The reaction in the combustor compared with the stoichiometric reaction of $AlH_3$ and $Fe_2O_3$:

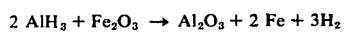

Based on this equation, theoretical calculations show that 0.85 liter of $H_2$ at STP conditions should be produced from 2.80g of the propellant formulation. The 2.80g propellant actually produced 0.84 liter of $H_2$ gas at STP condition which is a 98 percent yield. The $H_2$ gas was determined to have a purity greater than 99 mole percent.

Where the highest purity of hydrogen gas is required, such as for laser use, the unsolvated form of aluminum hydride or aluminum deuteride is preferred. The unsolvated aluminum hydrides have been manufactured under the designations aluminum hydride 58 and aluminum hydride 1451. The designation 58 identifies the unsolvated aluminum hydride having the maximum absorption in the infrared at 5.8 microns and is commonly referred to as aluminum hydride 58. The designation of 1451 relates to the x-ray diffracting characteristics for aluminum hydride which is an unsolvated aluminum hydride 58 or equivalent. Aluminum hydride 58 and aluminum hydride 1451 are commercially available in quantities.

Although, $AlH_3$ 58 and $AlH_3$ 1451 can be made by a number of methods including the method disclosed in U.S. Pat. No. 3,751,566, the widely accepted methods include reacting an etheral solution of an alkali metal aluminum hydride with either a boron trihalide or aluminum chloride or an ether-aromatic solvent solution of an alkali metal aluminum hydride with the specified reactants. The aluminum hydride solution produced is concentrated in a vacuum precipitator forming a slurry of aluminum hydride etherate. Ethereal solutions of lithium aluminum hydride, lithium aluminum hydride-magnesium, and lithium borohydride are added to the slurry in the proper amounts. The slurry is then fed to a continuous crystallizer to form the desired magnesium dropped aluminum hydride, $AlH_3$ - 1451. Magnesium improves thermal and storage stability. The magnesium dopped aluminum hydride is not required if the material is not to be stored or to be compounded with other compounds.

Although the high purity of hydrogen required in laser use can be produced by the method of this invention, high purity hydrogen can also be produced for fuel cell use or for any other use where a high level of purity is required. Where the highest level of purity of hydrogen is not required, the method of this invention could employ some of the hydrides which do not have the high purity of aluminum hydride 1451 or aluminum hydride 58. These aluminum hydrides include aluminum hydride 57, 59, and 60.

This invention is not limited to aluminum hydride ($AlH_3$) but may be extended to aluminum deuteride ($AlD_3$) as a source of hot deuterium gas and to other aluminum-hydrogen containing compounds. Also this invention is not limited to the production of hydrogen and deuterium for use in the chemical and gas dynamic lasers, but may be used to generate chemically pure and hot hydrogen gas as a reducing fuel. Since the reaction of this invention produces a temperature of around 3000°C, it may have a potential use as an igniter system for certain propellant grains that require a high temperature for ignition. When so used other ignition means (e.g. igniter or primer) can be used.

We claim:

1. A solid propellant composition that produces high temperature, chemically pure hydrogen or deuterium from a self-sustaining reaction after said reaction is initiated by a heat source sufficient to initiate said reaction, said solid propellant composition comprising a uniform mixture of a stoichiometric amount of ferric oxide ($Fe_2O_3$) that has been rendered moisture free by drying at a temperature of about 550°C and a stoichiometric amount of an unsolvated compound selected from the unsolvated compounds consisting of unsolvated aluminum hydride and unsolvated aluminum deuteride, said stoichiometric amount being based on the reaction:

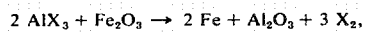

$$2\ AlX_3 + Fe_2O_3 \rightarrow 2\ Fe + Al_2O_3 + 3\ X_2,$$

wherein X is hydrogen or deuterium.

2. A method for producing high temperature and chemically pure hydrogen or deuterium from an initiated reaction that is self-sustaining, said method comprising:
   i. combining ferric oxide ($Fe_2O_3$) that has been rendered moisture free by drying at about 550°C in an amount of about one gram mole with an unsolvated compound selected from unsolvated aluminum hydride and unsolvated aluminum deuteride in an amount of about 2 gram moles;
   ii. mixing to achieve a uniform mixture of said ferric oxide and said compound selected;
   iii. forming said mixture into a pellet by pressing in a die while using a pressure of at least 500 psi;
   iv. placing said pellet in a sealable combustion apparatus adapted for operating under vacuum or pressure, said pellet being placed in electrical contact with an ignition wire comprised of about 80 weight percent nickel and of about 20 weight percent chromium;
   v. evacuating said combustion apparatus to remove all the air and water vapor; and thereafter
   vi. supplying an amount of electrical energy to produce sufficient heat to initiate a reaction which is a self-sustaining reaction whereby said hydrogen or deuterium is produced until said reaction is completed.

3. The method of claim 2 wherein said amount of electrical energy supplied is equivalent to about 10 volts at about 10 amperes and wherein said compound selected is unsolvated aluminum hydride and wherein said reaction produces said hydrogen having a temperature of about 3,000°C.

4. The method of claim 2 wherein said amount of electrical energy supplied is equivalent to about 10 volts at about 10 amperes and wherein said compound selected is unsolvated aluminum deuteride and wherein said reaction produces said deuterium having a temperature of about 3,000°C.

* * * * *